United States Patent
Kim et al.

(10) Patent No.: US 12,298,125 B2
(45) Date of Patent: May 13, 2025

(54) APPARATUS FOR INSPECTING SWELLING OF BATTERY CELL

(71) Applicant: LG ENERGY SOLUTION, LTD., Seoul (KR)

(72) Inventors: Do-Yul Kim, Daejeon (KR); Dong-Wan Ko, Daejeon (KR); Ki-Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 184 days.

(21) Appl. No.: 17/791,932

(22) PCT Filed: Mar. 3, 2021

(86) PCT No.: PCT/KR2021/002634
§ 371 (c)(1),
(2) Date: Jul. 11, 2022

(87) PCT Pub. No.: WO2021/182792
PCT Pub. Date: Sep. 16, 2021

(65) Prior Publication Data
US 2023/0046208 A1    Feb. 16, 2023

(30) Foreign Application Priority Data
Mar. 12, 2020   (KR) .................. 10-2020-0030940

(51) Int. Cl.
*G01L 1/22*         (2006.01)
*G01B 21/32*        (2006.01)
*H01M 10/42*        (2006.01)

(52) U.S. Cl.
CPC ............ *G01B 21/32* (2013.01); *G01L 1/2206* (2013.01); *H01M 10/4285* (2013.01)

(58) Field of Classification Search
CPC .. G01B 21/32; G01L 1/2206; H01M 10/4285; H01M 10/42; H01M 10/48;
(Continued)

(56) References Cited

U.S. PATENT DOCUMENTS

| | | | | |
|---|---|---|---|---|
| 6,143,440 A | * | 11/2000 | Volz .................... | H01M 50/578 429/61 |
| 2002/0098410 A1 | * | 7/2002 | Leysieffer ............ | H04R 25/305 429/61 |

(Continued)

FOREIGN PATENT DOCUMENTS

| CN | 103217136 A | 7/2013 |
|---|---|---|
| CN | 106532156 A | 3/2017 |

(Continued)

OTHER PUBLICATIONS

International Search Report (PCT/ISA/210) issued in PCT/KR2021/002634 mailed on Jun. 16, 2021.

(Continued)

*Primary Examiner* — David J Bolduc
(74) *Attorney, Agent, or Firm* — Birch, Stewart, Kolasch & Birch, LLP

(57) ABSTRACT

Discussed is an apparatus for inspecting swelling of a battery cell, the apparatus including a first plate configured in a plate shape; a second plate configured in a plate shape and located to face the first plate to be spaced therefrom by a predetermined interval, the second plate being configured so that the battery cell is to be interposed between the first plate and the second plate; a fixing frame configured so that a portion of the first plate is fixedly coupled thereto; a connection frame having one end fixedly coupled to the second plate and another end fixedly coupled to the fixing frame; and a measuring element attached to the connection (Continued)

frame and configured to measure a deformation rate of the connection frame based on the swelling of the battery cell.

19 Claims, 9 Drawing Sheets

(58) Field of Classification Search
CPC ....... H01M 10/486; G01K 1/026; G01K 1/02; Y02E 60/10
See application file for complete search history.

(56) References Cited

U.S. PATENT DOCUMENTS

| | | | |
|---|---|---|---|
| 2005/0160837 A1 | 7/2005 | Tellenbach et al. | |
| 2006/0093896 A1* | 5/2006 | Hong | H01M 10/42 |
| | | | 429/61 |
| 2008/0097704 A1* | 4/2008 | Notten | H01M 10/445 |
| | | | 702/42 |
| 2009/0079397 A1* | 3/2009 | Ibrahim | H02J 7/0029 |
| | | | 320/136 |
| 2011/0027630 A1* | 2/2011 | Tsutsumi | H01M 10/0459 |
| | | | 429/153 |
| 2012/0282496 A1* | 11/2012 | Schaefer | B60L 50/64 |
| | | | 429/100 |
| 2012/0286739 A1* | 11/2012 | O'Brien, Jr. | H01M 10/482 |
| | | | 73/818 |
| 2013/0150230 A1* | 6/2013 | Taylor | H01M 4/88 |
| | | | 977/762 |
| 2013/0209882 A1* | 8/2013 | Kim | C08K 5/5406 |
| | | | 524/114 |
| 2013/0257382 A1* | 10/2013 | Field | H02J 7/0071 |
| | | | 320/136 |
| 2014/0107949 A1* | 4/2014 | Arnold | G01R 31/392 |
| | | | 702/42 |
| 2014/0170446 A1* | 6/2014 | Elian | G01M 3/3272 |
| | | | 73/49.3 |
| 2015/0160302 A1* | 6/2015 | Xu | H01M 10/42 |
| | | | 324/427 |
| 2015/0188198 A1* | 7/2015 | Bonhomme | B60L 58/16 |
| | | | 429/61 |
| 2015/0244025 A1* | 8/2015 | Rhee | C08K 3/105 |
| | | | 429/307 |
| 2016/0064780 A1* | 3/2016 | Jarvis | H01M 10/4257 |
| | | | 429/61 |
| 2016/0064972 A1* | 3/2016 | Stefanopoulou | H02J 7/0013 |
| | | | 324/426 |
| 2016/0315352 A1* | 10/2016 | Jiang | H01M 50/119 |
| 2016/0380317 A1* | 12/2016 | Lin | H01M 10/4285 |
| | | | 324/427 |
| 2017/0141360 A1* | 5/2017 | Brun-Buisson | H01M 10/0525 |
| 2017/0324122 A1* | 11/2017 | Poirier | H01M 50/44 |
| 2018/0254443 A1* | 9/2018 | Liao | B60K 1/04 |
| 2019/0341585 A1* | 11/2019 | Shi | H01M 50/24 |
| 2020/0158596 A1* | 5/2020 | Kim | H01M 10/48 |
| 2020/0280108 A1* | 9/2020 | Tomar | B60L 58/21 |
| 2020/0328423 A1* | 10/2020 | Li | H01M 4/136 |
| 2020/0335833 A1* | 10/2020 | Schmidt | H01M 10/48 |
| 2020/0381689 A1* | 12/2020 | Nakadate | H01G 9/02 |
| 2021/0111412 A1* | 4/2021 | Liang | H01M 4/366 |
| 2021/0148989 A1* | 5/2021 | Malloy | B60L 58/16 |
| 2021/0184265 A1* | 6/2021 | Batson | H01M 50/105 |
| 2021/0197691 A1* | 7/2021 | Stefanopoulou | H01M 10/44 |
| 2021/0270908 A1* | 9/2021 | Masuda | H01M 10/0525 |
| 2022/0399587 A1* | 12/2022 | Song | H01M 10/425 |
| 2023/0118071 A1* | 4/2023 | Laramie | H01M 10/425 |
| | | | 429/7 |
| 2023/0216162 A1* | 7/2023 | Hauler | H01M 50/627 |
| | | | 429/56 |

FOREIGN PATENT DOCUMENTS

| | | |
|---|---|---|
| CN | 109238912 A | 1/2019 |
| CN | 109342200 A | 2/2019 |
| CN | 209588918 U | 11/2019 |
| JP | 2005-214969 A | 8/2005 |
| JP | 2010-32492 A | 2/2010 |
| JP | 2010-165585 A | 7/2010 |
| JP | 2012-48853 A | 3/2012 |
| JP | 2017-212163 A | 11/2017 |
| KR | 10-2008-0109121 A | 12/2008 |
| KR | 10-2013-0009030 A | 1/2013 |
| KR | 10-2017-0042082 A | 4/2017 |
| KR | 10-1741193 B1 | 5/2017 |
| KR | 10-2018-0136192 A | 12/2018 |
| WO | WO2017/087807 A1 | 5/2017 |

OTHER PUBLICATIONS

Extended European Search Report for European Application No. 21767574.3, dated Oct. 28, 2024.

* cited by examiner

APPARATUS FOR INSPECTING SWELLING OF BATTERY CELL

TECHNICAL FIELD

The present application claims priority to Korean Patent Application No. 10-2020-0030940 filed on Mar. 12, 2020 in the Republic of Korea, the disclosures of which are incorporated herein by reference.

The present disclosure relates to an apparatus for inspecting swelling of a battery cell, and more particularly, to an apparatus for inspecting swelling of a battery cell, which may inspect swelling of a battery cell based on pressure distribution of the battery cell.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

Such a battery may cause swelling in which gas is generated in the battery during charging and discharging or in a high temperature state to inflate the battery. Since there is a risk of fire or explosion due to battery swelling, it is important to accurately inspect the swelling behavior of the battery.

Conventionally, an evaluation system and a fixing jig for evaluating the state change of a battery caused by charging and discharging have been disclosed (Patent Document 1). Specifically, Patent Document 1 discloses a configuration in which a battery is fixed using the fixing jig and elastic deformation of a spring provided in the fixing jig is detected through a strain gauge based on the change in volume of the battery.

However, since the elastic deformation of the spring detected in Patent Document 1 is affected only by the change in volume of the battery, if the change in volume of the battery is too small, the elastic deformation of the spring may not reach a measurable range of the deformation rate of the strain gauge. That is, since Patent Document 1 does not measure the deformation rate by amplifying the elastic deformation of the spring, there is a problem in that the detection accuracy itself may be lowered by the volume change of the battery.

In addition, since Patent Document 1 uses a spring, if the change in volume of the battery is too large so that the deformation force of the spring exceeds an elastic limit, there is a problem in that the evaluation system and the fixing jig of Patent Document 1 cannot evaluate the condition of the battery any longer.

(Patent Document 1) JP 2017-212163 A

DISCLOSURE

Technical Problem

The present disclosure is designed to solve the problems of the related art, and therefore the present disclosure is directed to providing an apparatus for inspecting swelling of a battery cell, which may inspect swelling of a battery cell even based on a small force applied by the swelling of the battery cell by amplifying and measuring the force applied by the swelling of the battery cell.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an apparatus for inspecting swelling of a battery cell, comprising: a first plate configured in a plate shape; a second plate configured in a plate shape and located to face the first plate to be spaced therefrom by a predetermined interval, the second plate being configured so that the battery cell is interposed between the first plate and the second plate; a fixing frame configured so that a portion of the first plate is fixedly coupled thereto; a connection frame having one end fixedly coupled to the second plate and the other end fixedly coupled to the fixing frame; and a pressure measuring element attached to the connection frame and configured to measure a deformation rate of the connection frame.

The connection frame may be configured such that at least a portion thereof is bent.

The connection frame may include: a horizontal portion having one end connected to the fixing frame and configured to be elongated in one direction; and a vertical portion provided at a distal end of the horizontal portion and configured to have a distal end toward the second plate.

The connection frame may be configured such that the distal end of the vertical portion is fixedly coupled to an outer side surface of the second plate.

The connection frame may be configured such that the distal end of the vertical portion is fixedly coupled to a center portion of the outer side surface of the second plate.

The fixing frame may be configured so that the interval between the first plate and the second plate is adjusted.

An apparatus for inspecting swelling of a battery cell according to another aspect of the present disclosure may further comprise a pressure measuring unit connected to the pressure measuring element and configured to receive the deformation rate of the connection frame measured by the pressure measuring element and measure a pressure value of the battery cell based on the received deformation rate of the connection frame when the battery cell is interposed between the first plate and the second plate.

The pressure measuring element may be configured to measure the deformation rate of the connection frame based on a force applied to the vertical portion by the pressure of the battery cell and a length of the horizontal portion in the one direction.

An apparatus for inspecting swelling of a battery cell according to still another aspect of the present disclosure may further comprise a control unit connected to the pressure measuring unit and configured to receive the pressure value of the battery cell from the pressure measuring unit, compare the received pressure value of the battery cell with a reference pressure value and determine at least one of the presence of swelling and a swelling degree of the battery cell according to the pressure value comparison result.

The connection frame may include a plurality of unit connection frames so that the plurality of unit connection frames are coupled to the second plate at a predetermined interval.

The pressure measuring element may be provided in plural and configured to be attached to each of the plurality of unit connection frames.

The pressure measuring unit may be configured to measure a pressure value of each section of the battery cell, based on a deformation rate of each of the plurality of unit connection frames measured by each of the plurality of pressure measuring elements.

The control unit may be configured to determine at least one of a swelling distribution of the battery cell and a swelling degree of each section, based on the pressure value of each section of the battery cell measured by the pressure measuring unit.

The pressure measuring unit may be configured to calculate a pressure value of each section of the battery cell from the deformation rate of each of the plurality of unit connection frames, in consideration of a length of the horizontal portion of the plurality of unit connection frames.

The second plate may be configured to include a plurality of second unit plates.

The plurality of unit connection frames may be configured to be coupled to a corresponding second unit plate among the plurality of second unit plates.

The plurality of unit connection frames may be configured to be coupled to a center portion of an outer side surface of the corresponding second unit plate.

An apparatus for inspecting swelling of a battery cell according to still another aspect of the present disclosure may further comprise a temperature measuring unit configured to measure a temperature of each of the plurality of second unit plates by using a temperature measuring element attached to each of the plurality of second unit plates.

The control unit may be configured to receive the temperature value of each of the plurality of second unit plates from the temperature measuring unit and further determine a temperature of each section of the battery cell.

Advantageous Effects

According to one aspect of the present disclosure, the magnitude of the force applied by the swelling of the battery cell may be amplified as much as the length of the horizontal portion of the connection frame. Therefore, even if a small force is applied by swelling, there is an advantage of precisely determining the presence of swelling of the battery cell.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
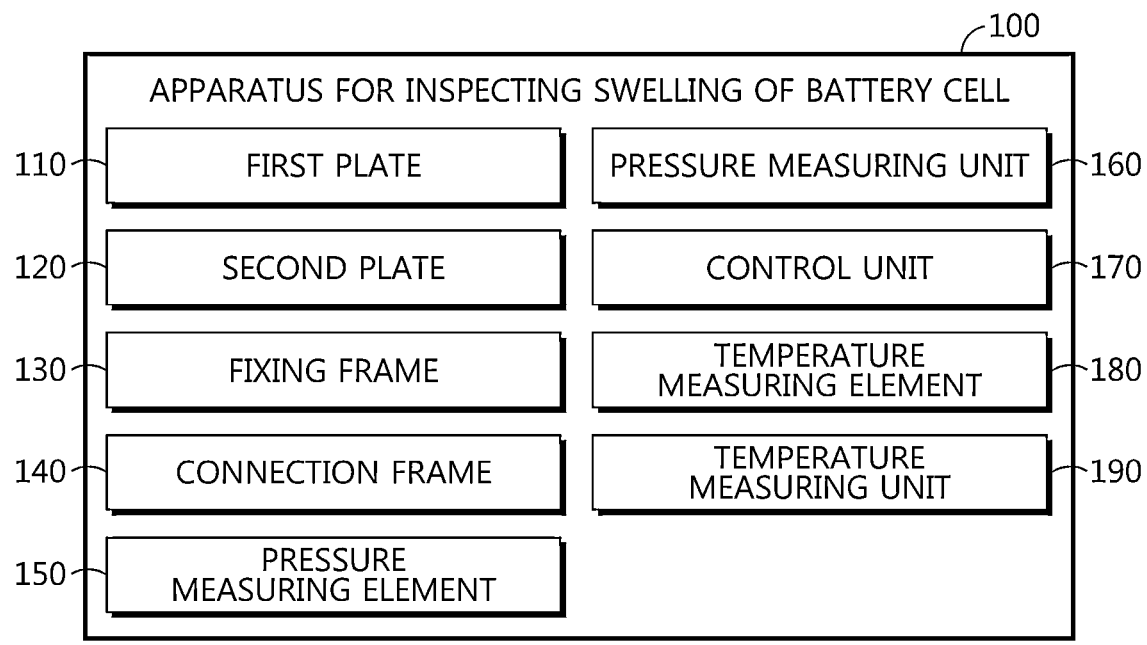
FIG. 1 is a diagram schematically showing an apparatus for inspecting swelling of a battery cell according to an embodiment of the present disclosure.

FIG. 1 is a diagram schematically showing an apparatus 100 for inspecting swelling of a battery cell according to an embodiment of the present disclosure.

Figure 2:
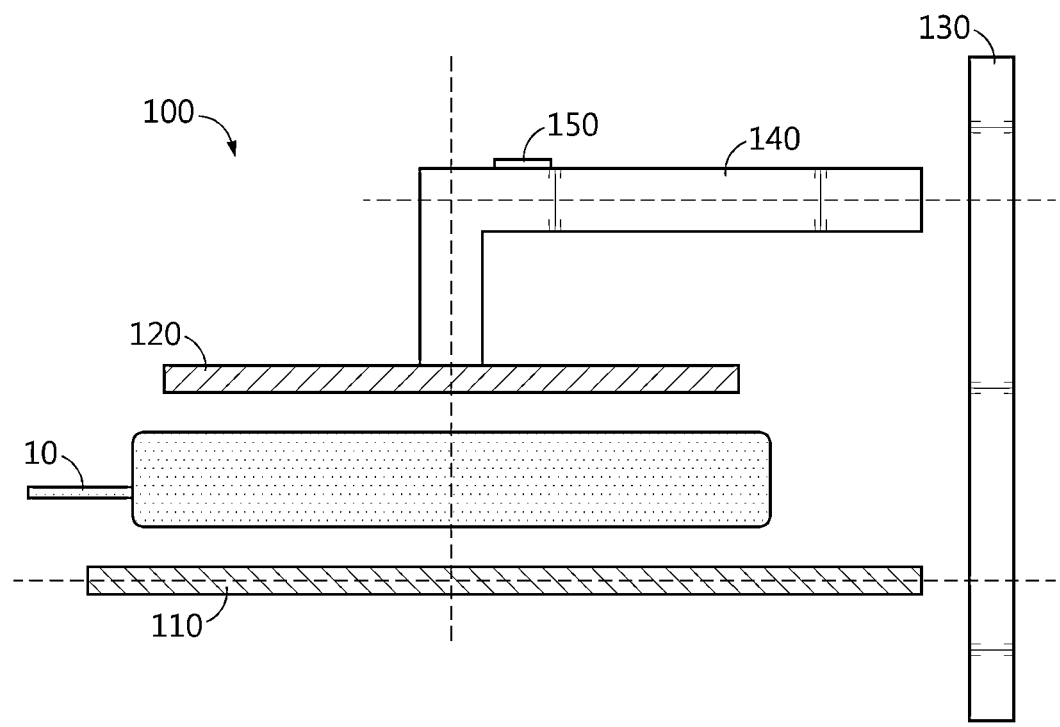
FIG. 2 is an exploded perspective view showing the apparatus for inspecting swelling of a battery cell according to an embodiment of the present disclosure.
Figure 3:
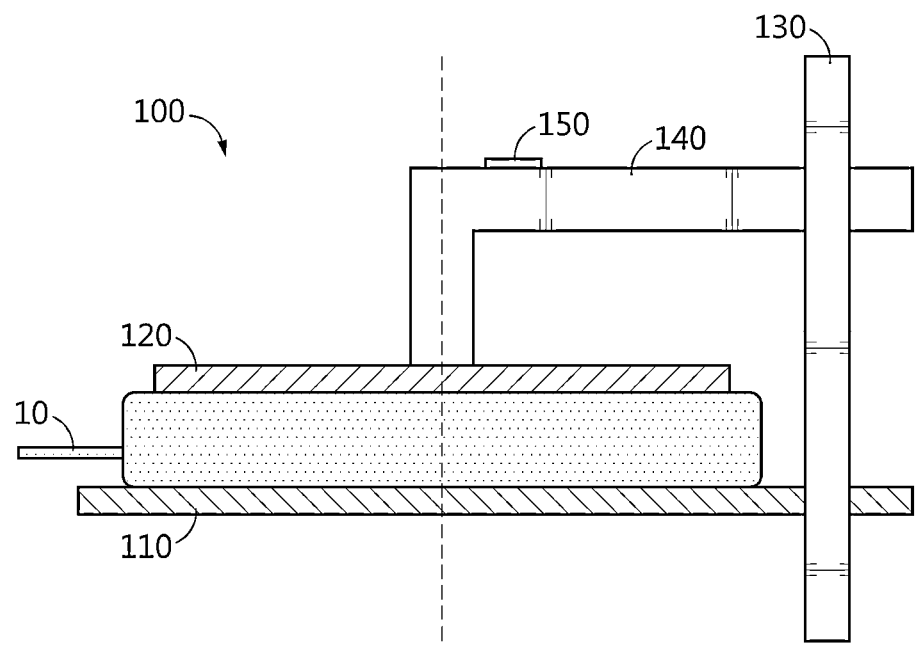
FIG. 3 is an assembled perspective view schematically showing the apparatus for inspecting swelling of a battery cell according to an embodiment of the present disclosure.

FIG. 2 is an exploded perspective view showing the apparatus 100 for inspecting swelling of a battery cell according to an embodiment of the present disclosure. FIG. 3 is an assembled perspective view schematically showing the apparatus 100 for inspecting swelling of a battery cell according to an embodiment of the present disclosure.

The apparatus 100 for inspecting swelling of a battery cell according to an embodiment of the present disclosure is a device for inspecting swelling of a battery cell 10, and may inspect the presence of swelling and/or a swelling degree.

Here, the battery cell 10 refers to one independent cell that has a negative electrode terminal and a positive electrode terminal and is physically separable. For example, one pouch-type lithium polymer cell may be regarded as the battery cell 10.

Referring to FIGS. 1 to 3, the apparatus 100 for inspecting swelling of a battery cell according to an embodiment of the present disclosure may include a first plate 110, a second plate 120, a fixing frame 130, a connection frame 140, and a pressure measuring element 150.

The first plate 110 may be configured in a plate shape.

Specifically, the first plate 110 may be configured in a plate shape so that the battery cell 10 may be seated thereon. In addition, the first plate 110 may be configured to have a wider horizontal area than the battery cell 10 so that a lower surface of the battery cell 10 may be seated thereon.

For example, the first plate 110 may be a lower plate on which the battery cell 10 may be placed.

The second plate 120 may be configured in a plate shape.

Specifically, the second plate 120 may be seated or attached to an upper surface of the battery cell 10.

For example, in the embodiment of FIG. 3, the upper surface and the lower surface of the battery cell 10 may be formed to be flat. Accordingly, the first plate 110 and the second plate 120 may be configured in a flat plate shape.

In addition, in order to increase the placing stability or the attachment stability of the second plate 120 on the upper surface of the battery cell 10, the horizontal area of the second plate 120 may be equal to or smaller than the horizontal area of the battery cell 10.

For example, in the embodiment of FIGS. 2 and 3, the horizontal area of the second plate 120 may be smaller than or equal to the horizontal area of the battery cell 10. Preferably, the horizontal area of the second plate 120 may be configured to be the same as the horizontal area of the battery cell 10, or may be configured to be smaller than the horizontal area of the battery cell 10 as much as a predetermined area in consideration of the thickness of a case of the battery cell 10.

That is, one surface of the first plate 110 and one surface of the second plate 120 may face each other. Preferably, one surface of the first plate 110 and one surface of the second plate 120 may be parallel to each other.

In addition, the second plate 120 may be configured such that the battery cell 10 is interposed between the second plate 110 and the first plate 110.

For example, in the embodiment of FIG. 3, the battery cell 10 may be interposed in a space between the first plate 110 and the second plate 120.

The fixing frame 130 may be configured such that a portion of the first plate 110 is fixedly coupled thereto.

Specifically, the first plate 110 may be fixedly coupled to the fixing frame 130, but the second plate 120 may not be fixedly coupled to the fixing frame 130.

Preferably, the first plate 110 may be coupled to the fixing frame 130 at a right angle. In addition, the first plate 110 may be fixed by the fixing frame 130 so as not to shake or rotate. Hereinafter, "fixed" or "fixed coupling" refers to a coupled state in which the coupled state is maintained with shaking or rotating.

In the embodiment of FIGS. 2 and 3, one fixing frame 130 is illustrated, but it is also possible that a plurality of fixing frames 130 are provided to fix the first plate 110. However, hereinafter, for convenience of explanation, it will be described that one fixing frame 130 is provided in the apparatus 100 for inspecting swelling of a battery cell according to an embodiment of the present disclosure.

The connection frame 140 may be configured such that one end is fixedly coupled to the second plate 120 and the other end is fixedly coupled to the fixing frame 130.

For example, in the embodiment of FIG. 3, the other end of the connection frame 140 may be fixedly coupled to the fixing frame 130, like the first plate 110. In addition, one end of the connection frame 140 may be fixedly coupled to the second plate 120. That is, the connection frame 140 may be fixed by the fixing frame 130. In addition, the connection frame 140 may fix the second plate 120.

The pressure measuring element 150 may be configured to be attached to the connection frame 140.

For example, in the embodiment of FIGS. 2 and 3, the pressure measuring element 150 may be attached to an outer surface of the connection frame 140. Preferably, the pressure measuring element 150 may be attached to an upper outer surface of the connection frame 140.

In addition, the pressure measuring element 150 may be configured to measure a deformation rate of the connection frame 140. To this end, the connection frame 140 may be made of a metal that elastically moves when a force is applied thereto.

For example, a strain gauge for measuring the deformation of the connection frame 140 may be applied to the pressure measuring element 150.

As in the embodiment of FIG. 3, if the battery cell 10 is interposed and fixed between the first plate 110 and the second plate 120, the volume of the battery cell 10 may change during charging and discharging of the battery cell 10. If the battery cell 10 is inflated to cause swelling, a force may be applied to the connection frame 140 by the pressure of the battery cell 10. In this case, the pressure measuring element 150 attached to the outer surface of the connection frame 140 may measure the deformation rate of the connection frame 140.

The connection frame 140 may be configured such that at least a portion thereof is bent.

Here, the "bent form" may mean a shape that the connection frame 140 is bent. For example, the connection frame 140 may be bent at an angle of greater than 0 degrees and less than or equal to 90 degrees in a form elongated in one direction.

For example, in the embodiments of FIGS. 2 and 3, a portion of the connection frame 140 may be bent at 90 degrees. In addition, one end of the connection frame 140 may be fixedly coupled to the second plate 120, and the other end may be fixedly coupled to the fixing frame 130. That is, one end surface of the connection frame 140 coupled to the second plate 120 and the other end surface of the connection frame 140 coupled to the fixing frame 130 may be perpendicular to each other.

The connection frame 140 will be described in more detail with reference to FIG. 4.

Figure 4:
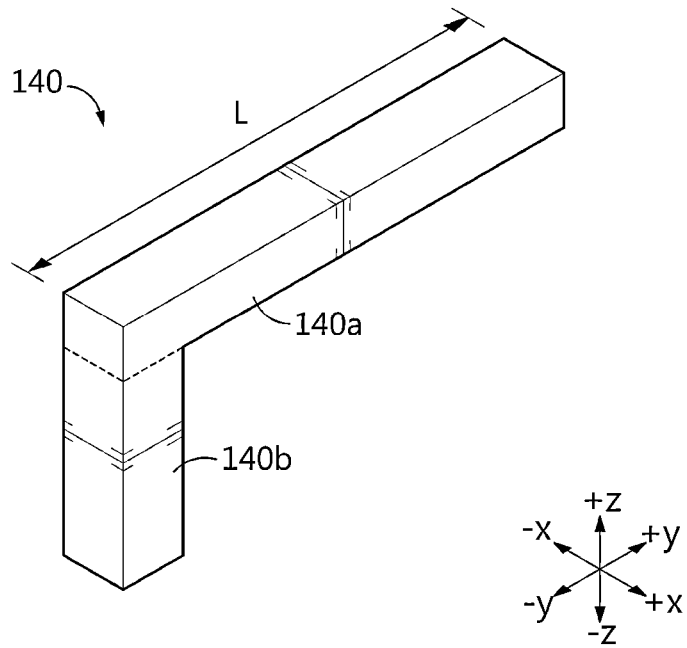
FIG. 4 is a diagram specifically showing a connection frame, in the apparatus for inspecting swelling of a battery cell according to an embodiment of the present disclosure.

FIG. 4 is a diagram specifically showing a connection frame 140, in the apparatus 100 for inspecting swelling of a battery cell according to an embodiment of the present disclosure.

The connection frame 140 may include a horizontal portion 140a and a vertical portion 140b.

For example, in the embodiment of FIG. 4, the connection frame 140 may be bent into the horizontal portion 140a and the vertical portion 140b. Even though FIG. 4 illustrates the horizontal portion 140a and the vertical portion 140b separately for convenience of explanation, it should be noted that the connection frame 140 may be applied as an integrated frame.

The horizontal portion 140a may be configured such that one end thereof is connected to the fixing frame 130 and elongated in one direction.

Here, "horizontal" may mean a direction parallel to the first plate 110. That is, the horizontal portion 140a of the connection frame 140 may be parallel to the first plate 110. Also, the horizontal portion 140a of the connection frame 140 may also be parallel to the second plate 120.

For example, in the embodiment of FIG. 4, the horizontal portion 140a may be elongated in the y direction (specifically, the -y direction). Also, the length of the horizontal portion 140a, that is, the length from one end of the horizontal portion 140a to the other end may be L.

The vertical portion 140b may be configured to be provided at a distal end of the horizontal portion 140a.

Here, "vertical" may mean a direction perpendicular to the first plate 110. That is, the vertical portion 140b of the connection frame 140 may be perpendicular to the first plate 110.

Specifically, the vertical portion 140b may be provided at the distal end of the horizontal portion 140a and configured to be elongated in a direction perpendicular to the longitudinal direction of the vertical portion 140b. For example, in the embodiment of FIG. 4, the vertical portion 140b may be provided at the distal end of the horizontal portion 140a and configured to be elongated in the z direction (specifically, the -z direction).

Both the vertical portion 140b and the horizontal portion 140a may include one end and the other end. For example, in the embodiment of FIG. 4, the vertical portion 140b includes one end and the other end based on the longitudinal direction (z direction), and the horizontal portion 140a also includes one end and the other end based on the longitudinal direction (y direction).

The other end of the horizontal portion 140a may be coupled to the fixing frame 130, and the other end of the vertical portion 140b may be provided at one end of the horizontal portion 140a. In addition, the vertical portion 140b may be configured such that the distal end thereof faces the second plate 120. That is, one end of the vertical portion 140b may be configured to face the second plate 120.

Here, the longitudinal direction (-y direction) of the horizontal portion 140a and the longitudinal direction (-z direction) of the vertical portion 140b may be perpendicular to each other.

Figure 5:
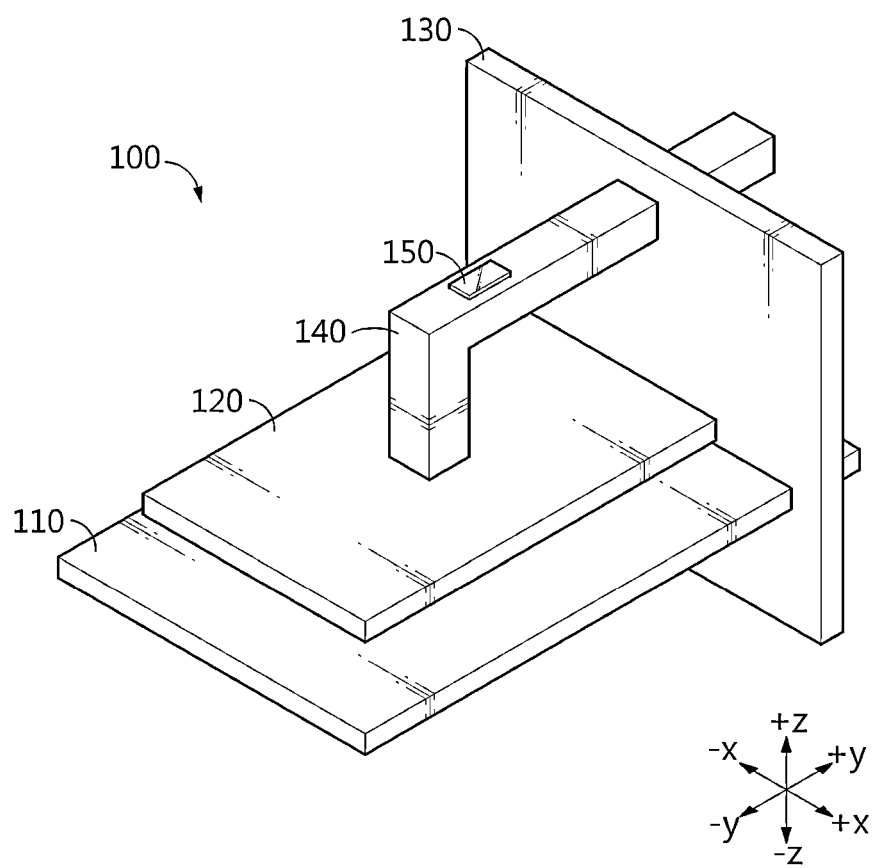
FIG. 5 is a diagram schematically showing an embodiment of the apparatus for inspecting swelling of a battery cell according to an embodiment of the present disclosure.
Figure 6:
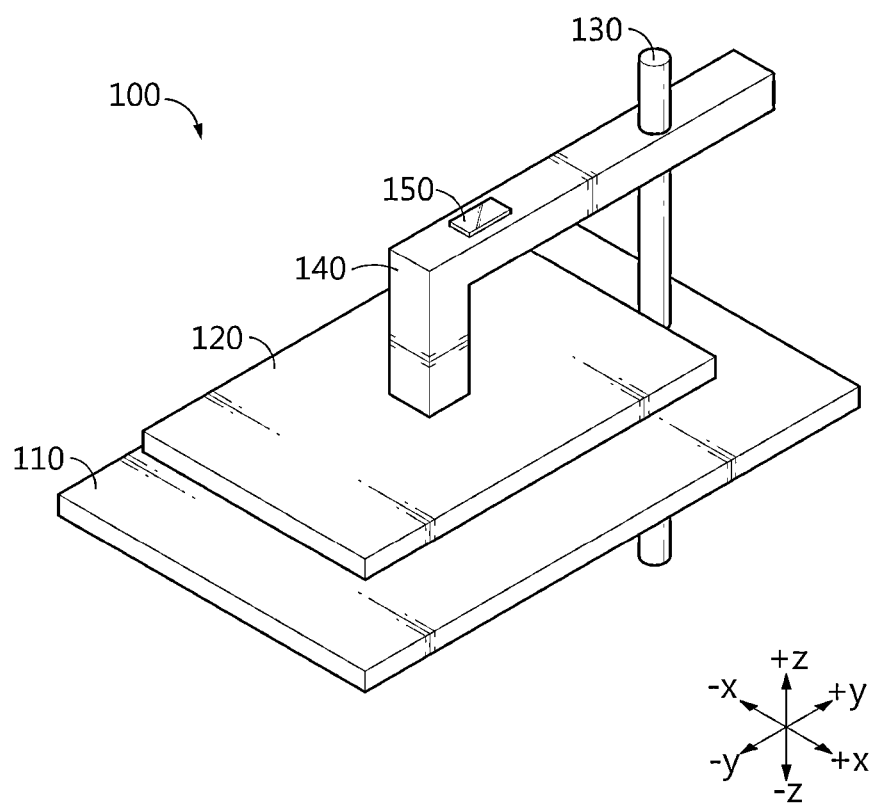
FIG. 6 is a diagram schematically showing another embodiment of the apparatus for inspecting swelling of a battery cell according to an embodiment of the present disclosure.

FIG. 5 is a diagram schematically showing an embodiment of the apparatus 100 for inspecting swelling of a battery cell according to an embodiment of the present disclosure. FIG. 6 is a diagram schematically showing another embodiment of the apparatus 100 for inspecting swelling of a battery cell according to an embodiment of the present disclosure.

Referring to FIGS. 5 and 6, the fixing frame 130 may be applied without limitation as long as it has a structure to which the connection frame 140 and the first plate 110 are coupled so that the connection frame 140 and the first plate 110 are fixed.

The connection frame 140 may be configured such that the distal end of the vertical portion 140b is fixedly coupled to the outer side surface of the second plate 120.

Specifically, in the embodiment of FIGS. 5 and 6, the outer side surface of the second plate 120 may be an upper surface of the second plate 120 in the +z direction. That is, the vertical portion 140b of the connection frame 140 may be fixedly coupled to the upper surface of the second plate 120.

For example, referring to the structure of the connection frame 140 shown in FIG. 4, in the embodiment of FIGS. 5 and 6, one end of the connection frame 140 (one end of the vertical portion 140b) may be fixedly coupled to the upper surface of the second plate 120 located in the +z direction. That is, the longitudinal direction (-z direction) of the vertical portion 140b of the connection frame 140 may be perpendicular to a plane (x-y plane) formed by the first plate 110. Also, the longitudinal direction (-z direction) of the vertical portion 140b of the connection frame 140 may also be perpendicular to a plane (x-y plane) formed by the second plate 120.

Accordingly, the second plate 120 is fixedly coupled to the connection frame 140 and thus may not be shaken or rotated. In addition, if the battery cell 10 is interposed between the first plate 110 and the second plate 120, the force applied to the second plate 120 due to the swelling of the battery cell 10 may be transferred to the connection frame 140.

If the second plate 120 and the vertical portion 140b of the connection frame 140 are not perpendicular to each other and are coupled to be inclined by a predetermined angle θ relative to the z direction, the force applied to the second plate 120 by the swelling of the battery cell 10 may be reduced in proportion to Cos θ and transferred to the vertical portion 140b of the connection frame 140. In addition, the pressure measuring element 150 may measure the deformation rate of the connection frame 140 based on the force applied to the connection frame 140. Therefore, if the second plate 120 and the vertical portion 140b of the connection frame 140 are fixedly coupled as being inclined by the predetermined angle θ based on the z direction, since the force transferred to the connection frame 140 is reduced, the error of the deformation rate of the connection frame 140 measured by the pressure measuring element 150 may increase. Accordingly, preferably, the second plate 120 and the vertical portion 140b of the connection frame 140 may be fixedly coupled to be perpendicular to each other.

Figure 7:
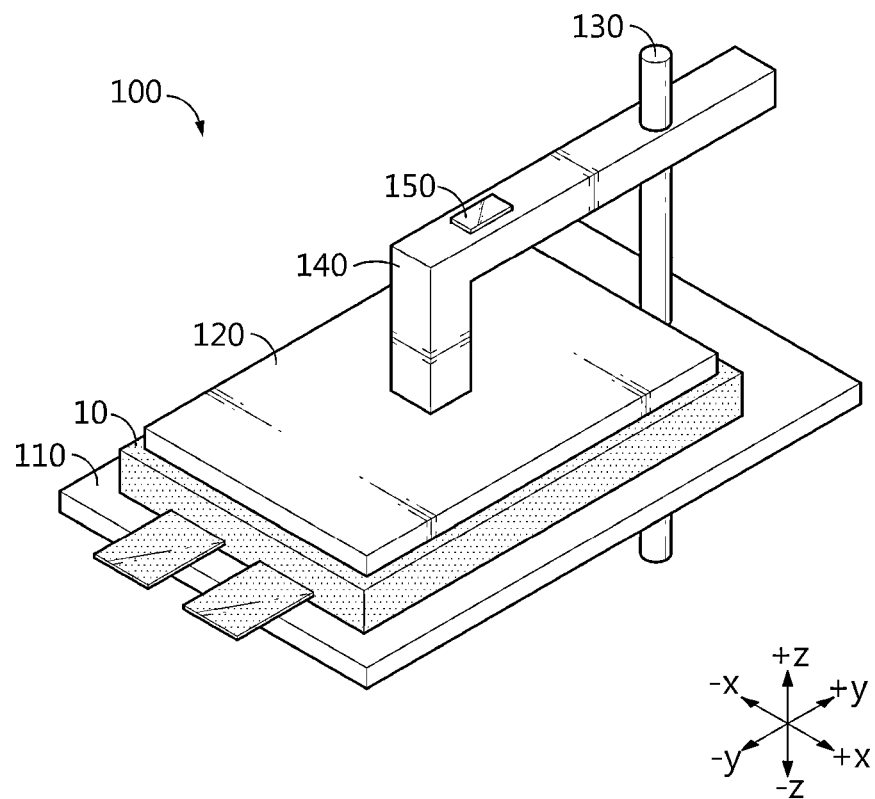
FIG. 7 is a perspective view showing an embodiment in which a battery cell is interposed in the apparatus for inspecting swelling of a battery cell according to an embodiment of the present disclosure.
Figure 8:
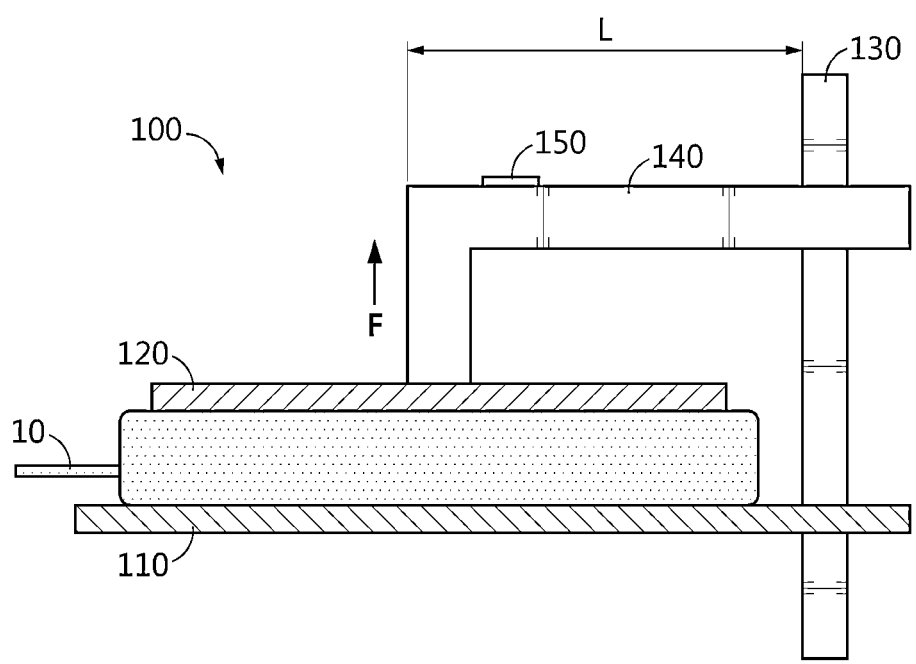
FIG. 8 is a side view schematically showing an embodiment in which a battery cell is interposed in the apparatus for inspecting swelling of a battery cell according to an embodiment of the present disclosure.

FIG. 7 is a perspective view showing an embodiment in which a battery cell 10 is interposed in the apparatus 100 for inspecting swelling of a battery cell according to an embodiment of the present disclosure. FIG. 8 is a side view schematically showing an embodiment in which a battery cell 10 is interposed in the apparatus 100 for inspecting swelling of a battery cell according to an embodiment of the present disclosure.

Referring to FIGS. 7 and 8, the battery cell 10 may be interposed and fixed between the first plate 110 and the second plate 120.

Preferably, the connection frame 140 may be configured such that the distal end of the vertical portion 140*b* is fixedly coupled to a center portion of the outer side surface of the second plate 120.

In general, the swelling of the battery cell 10 may occur not only in the center portion of the battery cell 10 but also in a peripheral portion thereof. Here, the peripheral portion refers to a region excluding the center portion. That is, the force applied to each part of the second plate 120 may be different depending on the location where the swelling occurs in the battery cell 10.

For example, if swelling occurs in the center portion of the battery cell 10, the greatest force may be applied to the center portion of the second plate 120. In addition, the force applied to the second plate 120 by the swelling may be evenly distributed to the peripheral portion of the second plate 120.

Meanwhile, if swelling occurs in a peripheral portion of the battery cell 10, the greatest force may be applied to a region corresponding to the peripheral portion of the battery cell 10 among the peripheral portions of the second plate 120.

That is, if the vertical portion 140*b* of the connection frame 140 is coupled to the peripheral portion of the outer side surface of the second plate 120, the deformation rate of the connection frame 140 measured by the pressure measuring element 150 may be inaccurate according to the location where the swelling occurs in the battery cell 10.

For example, in the embodiment of FIGS. 7 and 8, the vertical portion 140*b* of the connection frame 140 may be fixedly coupled to the center portion of the outer side surface of the second plate 120. In this case, the deviation between a force F applied to the connection frame 140 when swelling occurs in the center portion of the battery cell 10 and a force F applied to the connection frame 140 when swelling occurs in the peripheral portion of the battery cell 10 may be smallest.

As another example, in the embodiment of FIG. 7, it is assumed that the vertical portion 140*b* of the connection frame 140 is fixedly coupled to the peripheral portion of the second plate 120 in the +x direction. In this case, the force F applied to the connection frame 140 when swelling occurs in the center portion of the battery cell 10 and the force F applied to the connection frame 140 when swelling occurs in the peripheral portion of the battery cell 10 in the −x direction may have a large deviation.

That is, since the pressure measuring element 150 may measure the deformation rate of the connection frame 140 based on the force F applied to the connection frame 140, as the deviation of the force F applied to the connection frame 140 is greater, the deformation rate of the connection frame 140 measured by the pressure measuring element 150 may have a larger error.

Therefore, since the apparatus 100 for inspecting swelling of a battery cell according to an embodiment of the present disclosure is configured such that the connection frame 140 is fixedly coupled to the center portion of the outer side surface of the second plate 120, it is possible to minimize the error of the measured deformation rate of the connection frame 140 caused by the position where swelling occurs in the battery cell 10.

The fixing frame 130 may be configured to adjust the interval between the first plate 110 and the second plate 120.

Specifically, the fixing frame 130 may be configured to adjust a location where the connection frame 140 and/or the first plate 110 is coupled. Preferably, the location in the fixing frame 130 at which the connection frame 140 and/or the first plate 110 are fixedly coupled may be adjusted so that the battery cell 10 may be fixed between the first plate 110 and the second plate 120. Accordingly, the interval between the first plate 110 and the second plate 120 may be adjusted.

For example, in the embodiment of FIG. 7, the fixing frame 130 may be configured to adjust the position at which the connection frame 140 and/or the first plate 110 are fixed in a vertical direction (z direction).

If the interval between first plate 110 and the second plate 120 is not adjustable, there is a problem that the type of the battery cell 10 to be inspected is limited.

Therefore, since the apparatus 100 for inspecting swelling of a battery cell according to an embodiment of the present disclosure includes the fixing frame 130 configured to adjust the interval between the first plate 110 and the second plate 120, there is an advantage in that swelling of battery cells 10 having various thicknesses (for example, z direction length of the battery cell 10 in FIG. 7) may be inspected.

Hereinafter, a configuration in which the pressure of the battery cell 10 (the pressure generated due to the swelling of the battery cell 10) is measured by a pressure measuring unit 160 and a pressure measuring element 150 will be described.

Referring to FIG. 1, the apparatus 100 for inspecting swelling of a battery cell according to an embodiment of the present disclosure may further include a pressure measuring unit 160.

The pressure measuring unit 160 may be connected to the pressure measuring element 150 and configured to receive the deformation rate of the connection frame 140 measured by the pressure measuring element 150.

For example, the pressure measuring unit 160 may be connected to the pressure measuring element 150 through a wired line. In addition, the pressure measuring unit 160 may be configured to receive data on the deformation rate of the connection frame 140 measured by the pressure measuring element 150 through the wired line.

Specifically, the pressure measuring element 150 may be configured to measure the deformation rate of the connection frame 140 based on the force applied to the vertical portion 140*b* due to the pressure of the battery cell 10 and the length of the horizontal portion 140*a* in the one direction.

Here, the force applied to the vertical portion 140*b* of the connection frame 140 may be a force applied from the battery cell 10 to the vertical portion 140*b* of the connection frame 140 due to the swelling of the battery cell 10. More specifically, the force applied to the vertical portion 140*b* of the connection frame 140 may be a force applied to the portion where the second plate 120 and the vertical portion 140*b* of the connection frame 140 are coupled, among the forces applied to the second plate 120 due to the swelling of the battery cell 10.

In the embodiment of FIG. 8, it is assumed that the force applied to the vertical portion 140*b* of the connection frame 140 due to the swelling of the battery cell 10 is F and the length of the horizontal portion 140*a* of the connection frame 140 is L. If the force F is applied to the connection frame 140, the moment M of the connection frame 140 may be expressed as a calculation formula of "M=F×L". However, since the connection frame 140 is fixedly coupled to the fixing frame 130, the connection frame 140 may not rotate even if the force F is applied. Therefore, the moment M of the connection frame 140 may be exhibited as an elastic behavior of the connection frame 140. That is, if the force F is applied to the connection frame 140 due to the swelling of the battery cell 10, a tensile stress may be applied to the horizontal portion 140a of the connection frame 140 in proportion to the moment M. At this time, the tensile stress applied to the horizontal portion 140a of the connection frame 140 may be calculated as the deformation rate of the connection frame 140 by the pressure measuring element 150.

For example, if the force F is applied to the connection frame 140, the horizontal portion 140a of the connection frame 140 may be slightly bent. At this time, the pressure measuring element 150 may calculate the degree to which the horizontal portion 140a is slightly bent, as the deformation rate of the connection frame 140.

That is, the pressure measuring element 150 may measure the deformation rate of the connection frame 140 based on the moment M applied to the connection frame 140 due to the swelling of the battery cell 10.

For example, unlike the embodiment of FIG. 8, it is assumed that a load cell is applied as the pressure measuring element 150 and the pressure measuring element 150 is directly attached to the outer side surface of the second plate 120. In addition, it is assumed that the pressure measuring element 150 may measure the deformation rate of the second plate 120 based on the force F pressed by the second plate 120. If the magnitude of the force F pressed by the second plate 120 is less than or equal to a predetermined size, the magnitude of the force F may be outside the measurable range in which the pressure measuring element 150 is capable of measuring the force F. That is, if the magnitude of the force F pressed by the second plate 120 is smaller than a lower limit of the measurable range in which the pressure measuring element 150 is capable of measuring the force F, there is a problem in that the pressure measuring element 150 cannot measure the deformation rate of the second plate 120.

Meanwhile, in the embodiment of FIG. 8, based on the moment M according to the length L of the horizontal portion 140a of the connection frame 140 and the force F applied to the vertical portion 140b of the connection frame 140 due to the swelling of the battery cell 10, the deformation rate of the connection frame 140 may be measured. That is, based on the force F amplified as much as the length L of the horizontal portion 140a of the connection frame 140, the pressure measuring element 150 may measure the deformation rate of the connection frame 140. Therefore, even if the magnitude of the force F applied to the connection frame 140 is less than or equal to the predetermined size, since the force F is amplified as much as the length L of the horizontal portion 140a of the connection frame 140, the pressure measuring element 150 may measure the deformation rate of the connection frame 140.

In addition, the pressure measuring unit 160 may be configured to measure a pressure value of the battery cell 10 based on the received deformation rate of the connection frame 140, if the battery cell 10 is interposed between the first plate 110 and the second plate 120.

Specifically, the pressure measuring unit 160 may replace the deformation rate of the connection frame 140 received from the pressure measuring element 150 with the pressure value of the battery cell 10 in consideration of the length L of the horizontal portion 140a of the connection frame 140.

Therefore, by using the connection frame 140 having a bent form to include the horizontal portion 140a and the vertical portion 140b, even if the force F applied due to the swelling of the battery cell 10 is less than a predetermined size, the apparatus 100 for inspecting swelling of a battery cell according to an embodiment of the present disclosure may measure the pressure value according to the swelling of the battery cell 10. That is, the apparatus 100 for inspecting swelling of a battery cell may measure the pressure value of the battery cell 10 precisely by greatly expanding the range in which the swelling of the battery cell 10 can be measured by using the connection frame 140.

Referring to FIG. 1, the apparatus 100 for inspecting swelling of a battery cell according to an embodiment of the present disclosure may further include a control unit 170.

Here, the control unit 170 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 170 may be implemented as a set of program modules. At this time, the program module may be stored in a memory and executed by the control unit 170. The memory may be located inside or out of the control unit 170 and may be connected to the control unit 170 by various well-known means.

The control unit 170 may be connected to the pressure measuring unit 160 and configured to receive the pressure value of the battery cell 10 from the pressure measuring unit 160.

For example, the control unit 170 and the pressure measuring unit 160 may be communicatively connected by wire or wirelessly. In addition, the control unit 170 may receive the pressure value of the battery cell 10 measured by the pressure measuring unit 160.

In addition, the control unit 170 may be configured to compare the received pressure value of the battery cell 10 with a reference pressure value and to determine at least one of the presence of swelling and a swelling degree of the battery cell 10 according to the pressure value comparison result.

Here, the reference pressure value may be a reference value for determining whether swelling occurs in the battery cell 10. The reference pressure value may be stored in an internal memory of the control unit 170 or an external memory.

The control unit 170 may determine the presence of swelling of the battery cell 10 by comparing the pressure value of the battery cell 10 received from the pressure measuring unit 160 with the reference pressure value.

For example, if the pressure value of the battery cell 10 is less than the reference pressure value, the control unit 170 may determine that the swelling of the battery cell 10 does not occur. Conversely, if the pressure value of the battery cell 10 is equal to or greater than the reference pressure value, the control unit 170 may determine that the swelling of the battery cell 10 occurs.

In addition, the control unit 170 may determine the swelling degree of the battery cell 10 through the difference between the pressure value of the battery cell 10 received from the pressure measuring unit 160 and the reference pressure value.

For example, the control unit 170 may determine the swelling degree of the battery cell 10 as any one of normal, warning and dangerous, based on the difference between the pressure value of the battery cell 10 and the reference pressure value.

More specifically, the control unit 170 may calculate a pressure difference value according to the difference between the pressure value of the battery cell 10 and the reference pressure value. In addition, the control unit 170 may determine the swelling degree of the battery cell 10 according to a section to which the calculated pressure difference value belongs among a plurality of preset pressure sections.

Here, the plurality of pressure sections may be set as a normal section, a warning section and a dangerous section in advance. The plurality of pressure sections may be stored in an internal memory of the control unit 170 or an external memory.

In addition, the control unit 170 may determine the swelling degree of the battery cell 10 so that the calculated pressure difference value corresponds to a section to which it belongs, among the plurality of pressure sections.

Figure 9:
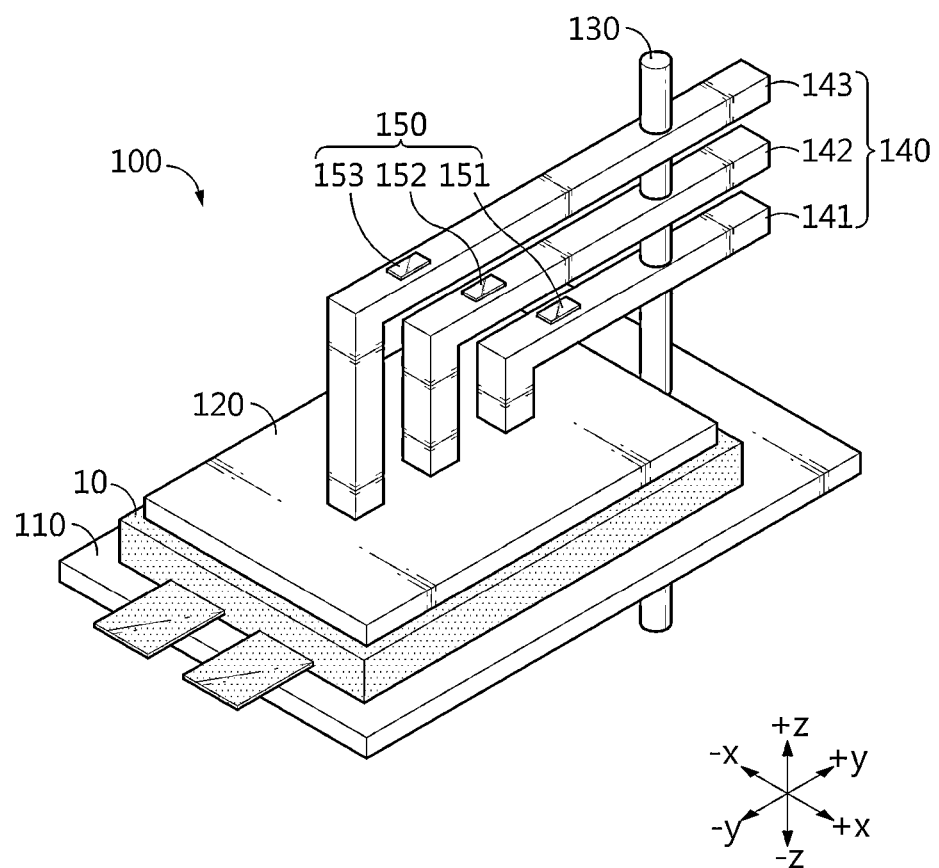
FIG. 9 is a diagram schematically showing an apparatus for inspecting swelling of a battery cell according to another embodiment of the present disclosure.

FIG. 9 is a diagram schematically showing an apparatus 100 for inspecting swelling of a battery cell according to another embodiment of the present disclosure.

Referring to FIG. 9, the connection frame 140 may be configured to include a plurality of unit connection frames 140.

For example, in the embodiment of FIG. 9, the connection frame 140 may be configured to include a first unit connection frame 141, a second unit connection frame 142, and a third unit connection frame 143. However, it should be noted that the number of unit connection frames 140 provided in the connection frame 140 is not limited by the embodiment shown in FIG. 9.

In addition, the connection frame 140 may be configured such that the plurality of unit connection frames 140 are coupled to the second plate 120 at a predetermined interval.

Preferably, the plurality of unit connection frames 140 may be coupled to the second plate 120 at a predetermined interval based on a midpoint of the outer side surface of the second plate 120.

For example, in the embodiment of FIG. 9, the second unit connection frame 142 may be coupled to the center portion of the outer side surface of the second plate 120. That is, the second unit connection frame 142 may be fixedly coupled to the center of the upper surface (the surface in the +z direction) of the second plate 120. In addition, the first unit connection frame 141 may be fixedly coupled to a location spaced apart from the second unit connection frame 142 by a predetermined distance in the +y direction. In addition, the third unit connection frame 143 may be fixedly coupled to a location spaced apart from the second unit connection frame 142 by a predetermined distance in the −y direction.

Preferably, the interval between the −y-directional edge of the upper surface of the second plate 120 and the third unit connection frame 143, the interval between the third unit connection frame 143 and the second unit connection frame 142, the interval between the second unit connection frame 142 and the first unit connection frame 141, and the interval between the +y-directional edge of the upper surface of the second plate 120 and the first unit connection frame 141 may be the same.

In addition, the pressure measuring element 150 is provided in plural and may be configured to be attached to each of the plurality of unit connection frames 140.

For example, in the embodiment of FIG. 9, the first pressure measuring element 151 may be attached to the first unit connection frame 141. The second pressure measuring element 152 may be attached to the second unit connection frame 142. The third pressure measuring element 153 may be attached to the third unit connection frame 143.

The plurality of pressure measuring elements 150 may measure a deformation rate of each of the plurality of unit connection frames 140. Therefore, if swelling occurs in the battery cell 10, the deformation rate of the first unit connection frame 141, the deformation rate of the second unit connection frame 142, and the deformation rate of the third unit connection frame 143 may be measured, respectively.

The pressure measuring unit 160 may be configured to measure a pressure value of each section of the battery cell 10, based on the deformation rate of each of the plurality of unit connection frames 140 measured by each of the plurality of pressure measuring elements 150.

Specifically, the plurality of pressure measuring elements 150 may be connected to the pressure measuring unit 160. The pressure measuring unit 160 may receive the deformation rate of each of the plurality of unit connection frames 140 from the plurality of pressure measuring elements 150.

In addition, the pressure measuring unit 160 may be configured to calculate the pressure value of each section of the battery cell 10 from the deformation rate of each of the plurality of unit connection frames 140 in consideration of the length of the horizontal portion 140a of the plurality of unit connection frames 140.

Specifically, the pressure measuring unit 160 may replace the deformation rate of each of the plurality of unit connection frames 140 with the pressure value of each section of the battery cell 10, based on the length of the horizontal portion 140a of the plurality of unit connection frames 140.

For example, in the embodiment of FIG. 9, the pressure measuring unit 160 may measure a first pressure value for the first section (the section in the +y direction) of the battery cell 10 corresponding to a portion of the second plate 120 to which the first unit connection frame 141 is coupled, based on the length of the horizontal portion 140a of the first unit connection frame 141 and the deformation rate of the first unit connection frame 141.

Similarly, the pressure measuring unit 160 may measure a pressure value for the second section of the battery cell 10 corresponding to a portion of the second plate 120 to which the second unit connection frame 142 is coupled, based on the length of the horizontal portion 140a of the second unit connection frame 142 and the deformation rate of the second unit connection frame 142. Specifically, the second unit connection frame 142 may be coupled to the center of the upper surface (the x-y plane in the +z direction) of the second plate 120. In addition, the center of the battery cell 10 may be aligned perpendicular to the center of the upper surface of the second plate 120. Accordingly, the pressure measuring unit 160 may measure a second pressure value of the center portion of the battery cell 10, based on the length of the horizontal portion 140a of the second unit connection frame 142 and the deformation rate of the second unit connection frame 142.

In addition, the pressure measuring unit 160 may measure a third pressure value for the third section (the section in the −y direction) of the battery cell 10 corresponding to a portion of the second plate 120 to which the third unit connection frame 143 is coupled, based on the length of the horizontal portion 140a of the third unit connection frame 143 and the deformation rate of the third unit connection frame 143.

The control unit 170 may be configured to determine at least one of a swelling distribution of the battery cell 10 and a swelling degree of each section, based on the pressure value of each section of the battery cell 10 measured by the pressure measuring unit 160.

Specifically, the control unit 170 may receive the pressure value of each section of the battery cell 10 corresponding to each of the plurality of unit connection frames 140 from the pressure measuring unit 160. In addition, the control unit 170 may determine the swelling distribution of the battery cell 10 according to the received pressure value of each section of the battery cell 10.

In the embodiment of FIG. 9, the control unit 170 may receive the first pressure value, the second pressure value and the third pressure value from the pressure measuring unit 160. After that, the control unit 170 may determine a swelling distribution for the first region, the second region and the third region of the battery cell 10 based on the first pressure value, the second pressure value and the third pressure value, respectively.

In addition, the control unit 170 may calculate a first pressure difference value between the first pressure value and a reference pressure value, calculate a second pressure difference value between the second pressure value and the reference pressure value, and calculate a third pressure difference value between the third pressure value and the reference pressure value. In addition, the control unit 170 may determine the swelling degree for each of the first region, the second region and the third region of the battery cell 10 by matching the first pressure difference value, the second pressure difference value and the third pressure difference value with a plurality of preset pressure sections.

For example, it is assumed that among the plurality of pressure sections, the first pressure difference value belongs to the danger section, the second pressure difference value belongs to the warning section, and the third pressure difference value belongs to the normal section. The control unit 170 may determine that the swelling degree of the first region of the battery cell 10 is the danger level, the swelling degree of the second region is the warning level, and the swelling degree of the third region is the normal level.

More preferably, the control unit 170 may be configured to determine the swelling distribution of each region of the battery cell 10 first and then determine the swelling degree of only the region of the battery cell 10 that is determined to have swelling.

In the former embodiment, it is assumed that the control unit 170 determines that swelling occurs in the first region and the second region of the battery cell 10. The control unit 170 may determine the swelling degree for the first region by matching the first pressure difference value for the first region of the battery cell 10 with the plurality of preset pressure sections. In addition, the control unit 170 may determine the swelling degree for the second region of the battery cell 10 by matching the second pressure difference value for the second region of the battery cell 10 with the plurality of preset pressure sections. Here, the control unit 170 may compare the sizes of the plurality of received pressure values and the reference pressure value, and determine that swelling occurs if the received pressure value is greater than or equal to the reference pressure value.

That is, the apparatus 100 for inspecting swelling of a battery cell according to another embodiment of the present disclosure may determine the swelling distribution of the battery cell 10 and/or the swelling degree of each region of the battery cell 10 by using the plurality of unit connection frames 140 and the plurality of pressure measuring elements 150. Accordingly, a region in which swelling occurs in the battery cell 10 may be specifically specified.

In addition, since the apparatus 100 for inspecting swelling of a battery cell may specifically determine the swelling degree of each region of the battery cell 10, there is an advantage of providing information for analyzing the cause of the swelling of the battery cell 10.

For example, based on the swelling distribution of the battery cell 10 and the swelling degree of each region obtained from the apparatus 100 for inspecting swelling of a battery cell, it is possible to distinguish whether the swelling is caused by an increase in pressure due to gas generation or an increase in pressure due to inflow of foreign substances.

Figure 10:
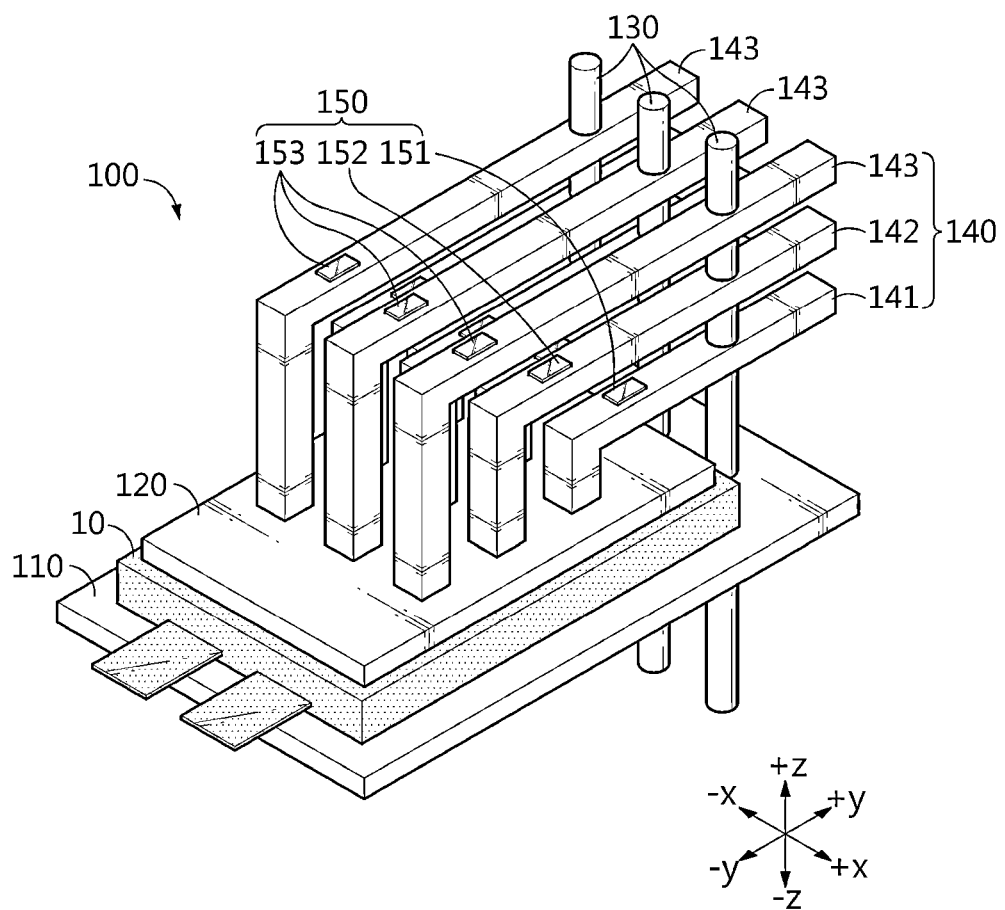
FIG. 10 is a diagram schematically showing an apparatus for inspecting swelling of a battery cell according to still another embodiment of the present disclosure.

FIG. 10 is a diagram schematically showing an apparatus 100 for inspecting swelling of a battery cell according to still another embodiment of the present disclosure.

In the embodiment of FIG. 10, the connection frame 140 may include a total of nine unit connection frames 140. When the second plate 120 is divided into nine parts, each unit connection frame 140 may be fixedly coupled to the center portion of the outer side surface of each part.

Then, each of the nine pressure measuring elements 150 may be attached to each of the plurality of unit connection frames 140 to measure the deformation rate of each of the plurality of unit connection frames 140.

As the number of the unit connection frames 140 and the pressure measuring elements 150 increases as above, the swelling distribution of the battery cell 10 may be determined more specifically and precisely. In addition, the sections of the battery cell 10, where the swelling degree is determined, may be further subdivided. Therefore, the section where swelling occurs in the battery cell 10 may be specified more concretely.

Figure 11:
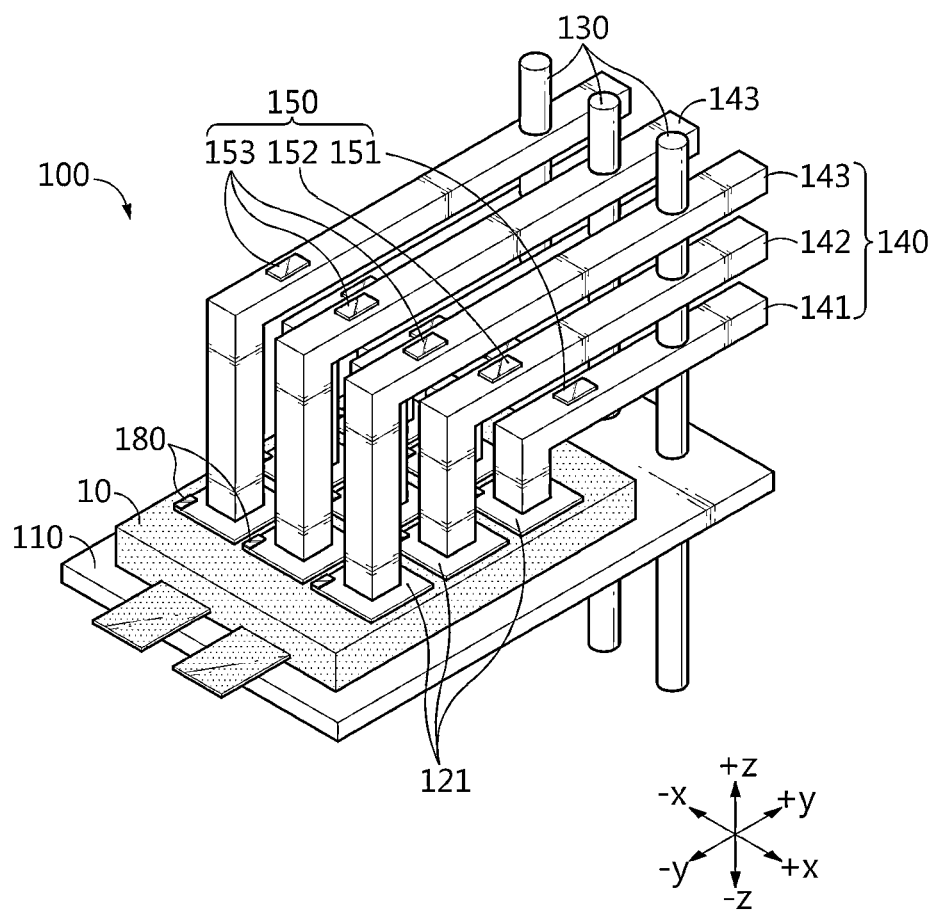
FIG. 11 is a diagram schematically showing an apparatus for inspecting swelling of a battery cell according to still another embodiment of the present disclosure.

FIG. 11 is a diagram schematically showing an apparatus 100 for inspecting swelling of a battery cell according to still another embodiment of the present disclosure.

The second plate 120 may be configured to include a plurality of second unit plates 121.

For example, in the embodiment of FIG. 11, it is assumed that the second plate 120 includes a total of nine second unit plates 121.

Preferably, the plurality of second unit plates 121 may be spaced apart from each other at a predetermined interval so as not to overlap each other.

Each of the plurality of unit connection frames 140 may be configured to be coupled to a corresponding second unit plate 121 among the plurality of second unit plates 121. Preferably, the plurality of unit connection frames 140 may be configured to be fixedly coupled to the center portion of the outer side surface of the corresponding second unit plate 121.

Each of the plurality of pressure measuring elements 150 attached to the plurality of unit connection frames 140 may measure a deformation rate of each of the plurality of unit connection frames 140.

In addition, the pressure measuring unit 160 may calculate the pressure value of each section of the battery cell 10 corresponding to each of the plurality of second unit plates 121, based on the deformation rate of each of the plurality of unit connection frames 140 measured by each of the plurality of pressure measuring elements 150. In this case, since the plurality of second unit plates 121 are positioned to be spaced apart from each other by a predetermined distance, the influence between them may be minimized.

For example, in the embodiment of FIG. 11, it is assumed that swelling occurs in the center portion of the battery cell 10. Due to the swelling occurring in the center portion of the battery cell 10, a force may be applied to the second unit plate 121 located in the center portion of the battery cell 10. In addition, due to the swelling occurring in the center portion of the battery cell 10, a force may also be applied to the plurality of second unit plates 121 located in the peripheral portion of the battery cell 10. However, since the second unit plate 121 located in the center portion of the battery cell 10 and the plurality of second unit plates 121 located in the peripheral portion are spaced apart from each other, the force applied to the second unit plate 121 located in the center portion of the battery cell 10 is not transferred to the plurality of second unit plates 121 located in the peripheral portion.

That is, since the plurality of second unit plates 121 are located to be spaced apart from each other, the influence between the adjacent second unit plates 121 may be excluded in the process of measuring the deformation rate of each of the plurality of unit connection frames 140.

In other words, the deformation rate of each of the plurality of unit connection frames 140 may be measured by reflecting the swelling pressure generated in the corresponding section of the battery cell 10 more accurately.

Figure 12:
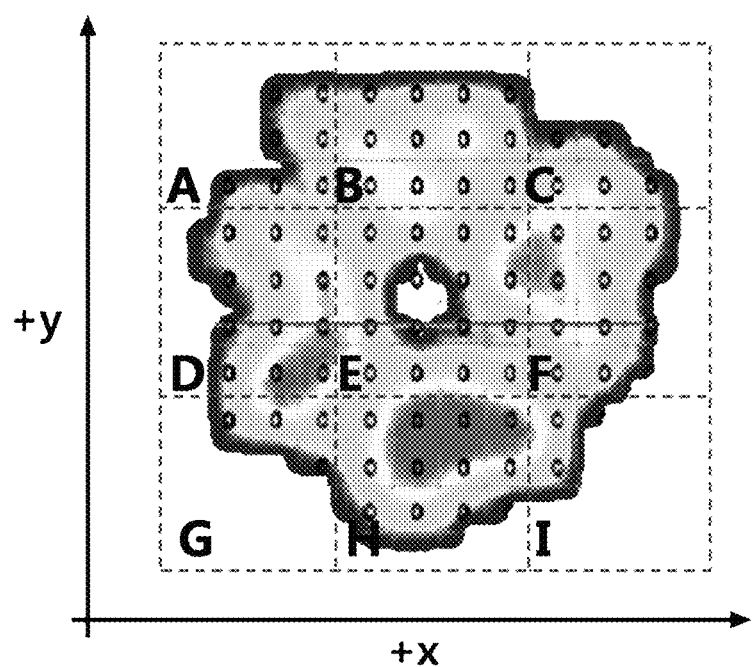
FIG. 12 is a diagram schematically showing a swelling inspection result of the battery cell by using the apparatus for inspecting swelling of a battery cell according to still another embodiment of the present disclosure.

FIG. 12 is a diagram schematically showing a swelling inspection result of the battery cell 10 by using the apparatus 100 for inspecting swelling of a battery cell 10 according to still another embodiment of the present disclosure.

The embodiment of FIG. 12 shows the swelling pressure distribution of each section of the battery cell 10 using the apparatus 100 for inspecting swelling of a battery cell according to the embodiment of FIG. 11. Specifically, the swelling inspection result of FIG. 12 shows a pressure distribution of each section of the battery cell 10 calculated based on the deformation rate of each of the plurality of unit connection frames 140 received by the pressure measuring unit 160 from the plurality of pressure measuring elements 150.

Referring to the swelling distribution of the battery cell 10 shown in FIG. 12, it may be determined that the degree of swelling is most severe in the section in the −y direction among the sections A to I of the battery cell 10 divided into 9 parts. That is, in the embodiment of FIG. 11, it may be seen that the most severe swelling occurs in the section H of the battery cell 10 corresponding to the second unit plate 121 located in the middle among the three second unit plates 121 located in the −y direction.

That is, since the apparatus 100 for inspecting swelling of a battery cell according to still another embodiment of the present disclosure includes a plurality of second unit plates 121 and a plurality of unit connection frames 140, there is an advantage in the swelling distribution of the battery cell 10 and the swelling degree of each section of the battery cell 10 may be determined more specifically.

Referring to FIG. 1, the apparatus 100 for inspecting swelling of a battery cell according to still another embodiment of the present disclosure may further include a temperature measuring element 180 and a temperature measuring unit 190.

The temperature measuring element 180 may be provided in plural and attached to each of the plurality of second unit plates 121.

In addition, the temperature measuring unit 190 may be configured to measure the temperature of each of the plurality of second unit plates 121 by using the plurality of temperature measuring element 180.

The control unit 170 may be configured to receive the temperature value of each of the plurality of second unit plates 121 from the temperature measuring unit 190 and further determine the temperature of each section of the battery cell 10.

For example, in the embodiment of FIG. 11, the temperature measuring element 180 may be attached to each of the plurality of second unit plates 121. In addition, the temperature measuring unit 190 may be connected to the plurality of temperature measuring element 180 to measure the temperature of each of the plurality of second unit plates 121. To this end, each of the plurality of second unit plates 121 may be made of a conductive material.

The control unit 170 may further determine the temperature of each section of the battery cell 10, together with at least one of the swelling distribution of the battery cell 10 and the swelling degree of each section of the battery cell 10.

If the internal temperature of the battery cell 10 rises to evaporate the electrolyte inside the battery cell 10, the pressure inside the battery cell 10 may increase, thereby causing swelling.

Therefore, the apparatus 100 for inspecting swelling of a battery cell according to still another embodiment of the present disclosure may determine the cause of swelling of the battery cell 10 more specifically, since not only the swelling distribution of the battery cell 10 and the swelling degree of each section of battery cell 10 but also the temperature of each section of the battery cell 10 are further considered.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

10: battery cell
100: apparatus for inspecting swelling of a battery cell
110: first plate
120: second plate
121: second unit plate
130: fixing frame
140: connection frame
140a: horizontal portion
140b: vertical portion
141: first connection frame
142: second connection frame
143: third connection frame
150: pressure measuring element 151: first pressure measuring element
152: second pressure measuring element
153: third pressure measuring element
160: pressure measuring unit
170: control unit
180: temperature measuring element
190: temperature measuring unit

What is claimed is:

1. An apparatus for inspecting swelling of a battery cell, the apparatus comprising:
a first plate configured in a plate shape;
a second plate configured in a plate shape and located to face the first plate to be spaced therefrom by a predetermined interval, the second plate being configured so that the battery cell is to be interposed between the first plate and the second plate;
a fixing frame directly connected to a portion of the first plate, and the fixing frame is separated from the second plate so that the second plate is not directly connected to the fixing frame;
a connection frame having one end directly connected to the second plate and another end directly connected to the fixing frame; and
a measuring element attached to the connection frame and configured to measure a deformation rate of the connection frame based on the swelling of the battery cell.

2. The apparatus for inspecting swelling of a battery cell according to claim 1, wherein the connection frame is configured such that at least a portion thereof is bent.

3. The apparatus for inspecting swelling of a battery cell according to claim 2, wherein the connection frame includes:
a horizontal portion having one end connected to the fixing frame and configured to be elongated in one direction; and
a vertical portion provided at a distal end of the horizontal portion and configured to have a distal end toward the second plate, and
wherein the portion of the connection frame that is bent is located between the horizontal portion and the vertical portion.

4. The apparatus for inspecting swelling of a battery cell according to claim 3, wherein the connection frame is configured such that the distal end of the vertical portion is fixedly coupled to an outer side surface of the second plate.

5. The apparatus for inspecting swelling of a battery cell according to claim 4, wherein the connection frame is configured such that the distal end of the vertical portion is fixedly coupled to a center portion of the outer side surface of the second plate.

6. The apparatus for inspecting swelling of a battery cell according to claim 3, wherein the fixing frame is configured so that the predetermined interval between the first plate and the second plate is adjusted.

7. The apparatus for inspecting swelling of a battery cell according to claim 3, further comprising:
a measurer connected to the measuring element and configured to receive the deformation rate of the connection frame measured by the measuring element and measure a pressure value of the battery cell based on the received deformation rate of the connection frame when the battery cell is interposed between the first plate and the second plate.

8. The apparatus for inspecting swelling of a battery cell according to claim 7, wherein the measuring element is configured to measure the deformation rate of the connection frame based on a force applied to the vertical portion by the pressure of the battery cell and a length of the horizontal portion in the one direction.

9. The apparatus for inspecting swelling of a battery cell according to claim 7, further comprising:
a controller connected to the measurer and configured to receive the pressure value of the battery cell from the measurer, compare the received pressure value of the battery cell with a reference pressure value and determine at least one of the presence of swelling and a swelling degree of the battery cell according to the pressure value comparison result.

10. The apparatus for inspecting swelling of a battery cell according to claim 8, wherein the connection frame includes a plurality of unit connection frames so that the plurality of unit connection frames are coupled to the second plate at a predetermined interval, and
wherein the measuring element is provided in plural and configured to be attached to each of the plurality of unit connection frames.

11. The apparatus for inspecting swelling of a battery cell according to claim 10, wherein the measurer is configured to measure a pressure value of each section of the battery cell, based on a deformation rate of each of the plurality of unit connection frames measured by each of the plurality of measuring elements, and
wherein the controller is configured to determine at least one of a swelling distribution of the battery cell and a swelling degree of each section, based on the pressure value of each section of the battery cell measured by the measurer.

12. The apparatus for inspecting swelling of a battery cell according to claim 11, wherein the measurer is configured to calculate a pressure value of each section of the battery cell from the deformation rate of each of the plurality of unit connection frames, in consideration of a length of the horizontal portion of the plurality of unit connection frames.

13. The apparatus for inspecting swelling of a battery cell according to claim 11, wherein the second plate is configured to include a plurality of second unit plates, and
wherein the plurality of unit connection frames are configured to be coupled to a corresponding second unit plate among the plurality of second unit plates.

14. The apparatus for inspecting swelling of a battery cell according to claim 13, wherein the plurality of unit connection frames are configured to be coupled to a center portion of an outer side surface of the corresponding second unit plate.

15. The apparatus for inspecting swelling of a battery cell according to claim 13, further comprising:
a temperature measurer configured to measure a temperature of each of the plurality of second unit plates by using a temperature measuring element attached to each of the plurality of second unit plates,
wherein the control unit is configured to receive the temperature value of each of the plurality of second unit plates from the temperature measurer and further determine a temperature of each section of the battery cell.

16. The apparatus for inspecting swelling of a battery cell according to claim 1, wherein the measuring element is a pressure measuring element to determine pressure causing the swelling of the battery cell.

17. The apparatus for inspecting swelling of a battery cell according to claim 1, wherein the measuring element is a strain gauge.

18. The apparatus for inspecting swelling of a battery cell according to claim 1, wherein the deformation rate of the connection frame is calculated from tensile stress applied to the connection frame.

19. The apparatus for inspecting swelling of a battery cell according to claim 1, wherein the connection frame is separated from the first plate to interpose the battery cell and the second plate between the connection frame and the first plate.

* * * * *